United States Patent

Honda et al.

[15] 3,694,415
[45] Sept. 26, 1972

[54] COATING RESINOUS COMPOSITION

[72] Inventors: Kiyoshi Honda, Osaka; Mitsumasa Miyazaki, Amagasaki; Shozaburo Nomura, Osaka; Kazuo Akiyama, Aokikonendan; Kazutoyo Hirose, Kawaguchi, all of Japan

[73] Assignees: Dainippon Ink & Chemicals, Inc., Tokyo; The Dainippon Ink Institute of Chemical Research, Kamikazaki, Urawa, Saitama Pref., Japan; part interest to each

[22] Filed: July 15, 1970

[21] Appl. No.: 55,212

[52] U.S. Cl. ..260/77.5 CR, 204/159.16, 204/159.22, 260/77.5 AT, 260/859 R
[51] Int. Cl. ............................................C08g 22/06
[58] Field of Search....260/77.5 CR, 77.5 AT, 859 R; 204/159.16, 159.22

[56] References Cited

UNITED STATES PATENTS 3,509,234    4/1970    Burlant et al. .........260/859 R
3,382,297    5/1968    Thompson.................260/836

*Primary Examiner*—Donald E. Czaja
*Assistant Examiner*—M. J. Welsh
*Attorney*—Oblon, Fisher & Spivak

[57] ABSTRACT

A resinous coating composition capable of forming a cured coating film in air when irradiated with high energy ionizing radiation is formed by the admixture of (1) a resin obtained by reacting (A) an hydroxyl-containing vinyl polymer or copolymer with (B) an ethylenically unsaturated isocyanate obtained by reacting 1.4 to 0.6 moles of an ester of an $\alpha$-$\beta$-unsaturated monocarboxylic acid containing at least one hydroxyl group in the molecule with one mole of a diisocyanate wherein 1,000 gm. of (A) is reacted with 0.1 to 0.4 gram equivalence of (B), to form a vinyl polymer or copolymer containing ethylenically unsaturated side chains, and (2) a monomer copolymerizable with said ethylenically unsaturated bonds in said resin (1).

10 Claims, No Drawings

COATING RESINOUS COMPOSITION

BACKGROUND OF THE INVENTION

1. Field Of The Invention:

This invention relates to a resinous coating composition modified with a vinyl polymer or copolymer which is easily air-curable under the action of high energy ionizing radiation and to processes for producing the same.

2. Description Of Prior Art:

It is well known to cross-link and cure polymeric coatings or films by the use of high energy ionizing radiation. The ionizing radiation causes the formation of free radicals in the polymer chain through which cross-linking of the polymer can occur. With ordinary coating compositions, it is essential during the irradiation treatment to minimize as greatly as possible the penetration of oxygen through the surface layer of the coating or film so as to prevent the oxygen from interfering with the free radical reaction.

Heretofore, however, most techniques for minimizing the oxygen effect in cross-linking of films have concentrated around the concept in either adding antioxidants to the coating composition or in effecting the radiation treatment under conditions whereby the oxygen effect is minimized, such as by irradiating the coating or film at very low temperatures and for very brief periods of time. Contrary to the direction of the prior art, it has now been found that certain polymeric coating compositions which contain ethylenically unsaturated side chains can be cross-linked quite easily under high energy ionizing radiation by ordinary free radical polymerization mechanisms without major oxygen hinderance. However, prior to the present invention, it was difficult to introduce suitable ethylenically unsaturated groups into vinyl type polymers. Vinyl type polymers have long been considered to be quite preferable coating compositions, since when properly cross-linked, they yield very hard films and coatings. Nevertheless, the prior art techniques for introducing unsaturated groups into the side chains of vinyl polymers generally had many disadvantages. For instance, it is well known to introduce α-β-active unsaturated groups onto hydroxy or carboxy-containing vinyl polymers by a variety of methods including, (1) esterification of the hydroxyl groups in the polymer with acrylic acid, methacrylic acid and/or α-chloroacrylic acid, or, (2) ring-opening esterification of carboxyl groups in the polymer with a glycidyl acrylate or methacrylate. The difficulty with these state-of-the-art techniques has been that the reaction product is apt to become insolubilized by cross-linking of the active unsaturated double bonds, because the reaction usually requires that a relatively high temperature be applied over a relatively extended period of time.

Recently, it has been reported in Belgian Pat. No. 693,267, issued to W.J. Burlant, et al., to form radiation cross-linkable resins by modifying an hydroxyl containing resinous material with a diisocyanate and thereafter reacting the modified resin with an hydroxylated vinyl containing monomer. Radiation cross-linking can then occur through the vinyl group. The Burlant, et al. product, however, has been found to be difficult to produce on an industrial scale. It has been found that when the diisocyanate is reacted with the hydroxyl containing resin, there is a tendency for a significant amount of cross-linking or gelation of the modified resin to occur which destroys its usefulness for subsequent treatment with the hydroxylated vinyl monomer or in the formation of a radiation cross-linkable composition. Where the molecular weight of the original resinous material is quite high it has been found that the tendency toward gelation during the diisocyanate reaction is quite high.

A second disadvantage with the Burlant, et al. technique is that the extent in which the final composition can be cured is frequently inadequate for many applications and the cured product may be easily swollen with solvent, has poor water resistance, or has a very soft surface even after extended radiation cross-linking treatments.

SUMMARY OF THE INVENTION

Accordingly, it is an object of this invention to provide a vinyl type resin which can easily be air-cured under the action of high energy ionizing radiation.

It is further an object of this invention to provide a high molecular weight vinyl type polymer which is characterized by good film forming properties which can be cross-linked in air under the action of high energy ionizing radiation without oxygen hinderance.

It is another object of this invention to provide a vinyl type resin containing coating composition which is readily cross-linkable in air under the action of high energy ionizing radiation so as to form a fully cross-linked resinous coating or film which is characterized by good solvent and water resistance and good surface hardness.

Still another object of this invention is to provide a novel technique for forming ethylenically unsaturated side groups onto a high molecular weight vinyl type resin without causing significant premature cross-linking or gelation.

These and other objects have now herein been attained by providing a coating composition by reacting (A) a hydroxy-substituted vinyl polymer or copolymer (hereinafter referred to as the "hydroxy polymer") with (B) 0.1 to 0.4 gram equivalents per 1,000 g. of the hydroxy polymer, of an unsaturated isocyanate obtained by reacting an ester of an α, β-unsaturated monocarboxylic acid containing at least one hydroxyl group in the molecule, with a diisocyanate in a molar ratio of 1.4 : 1 to 0.6 : 1, and preferably from 1.2 : 1 to 0.8 : 1, wherein said unsaturated isocyanate may conveniently be used in the form of a mixture obtained by said reaction without isolating it. A monomer which is copolymerizable with the resin may be added to the isocyanate.

DETAILED DESCRIPTION OF PREFERRED EMBODIMENTS

Several methods have now been found for introducing active unsaturated bonds into the side chains of hydroxy polymers using a diisocyanate and an ester of an α, β-unsaturated monocarboxylic acid containing one hydroxyl group in the molecule (hereinafter referred to as "hydroxyacrylates"):

(1) In the first method, also shown in the Burlant, et al. reference, supra., the hydroxy polymer and the diisocyanate are reacted in a proportion of two equivalents of isocyanate group per equivalent of hydroxyl group in the hydroxy polymer so that isocyanate groups are introduced into the side chains. The hydroxyacrylate is then added to the isocyanate modified polymer as shown in the following reaction schematic:

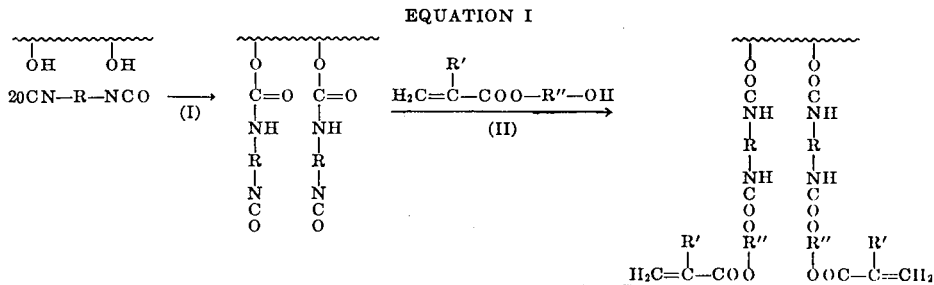

(2) In the second method, the hydroxy polymer is reacted concurrently with the diisocyanate and the hydroxy acrylate.

(3) In the third method, which constitutes the subject matter of the present invention, the diisocyanate and the hydroxyacrylate are reacted in approximately equimolar proportions to form an unsaturated isocyanate mixture containing the unsaturated monoisocyanate which has an active unsaturated bond in the molecule. The mixture is then reacted with the hydroxy polymer, as shown in the following reaction schematic:

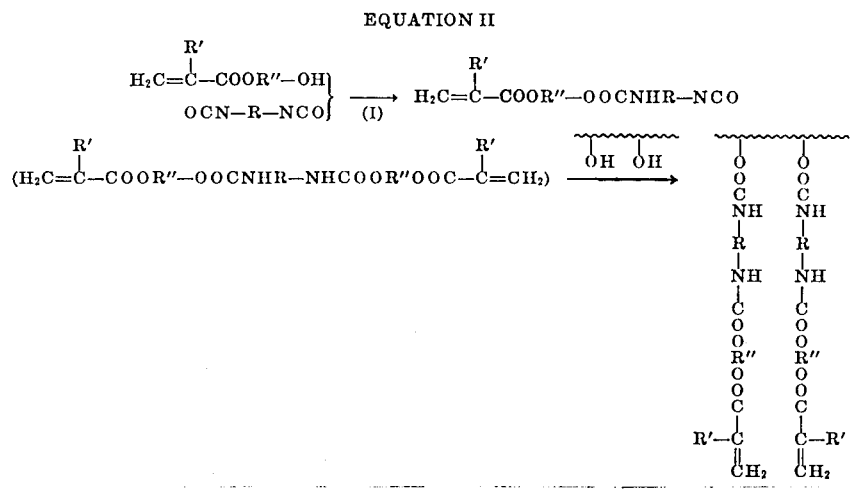

In the first two methods, some degree of cross-linking often occurs due to the reaction of the diisocyanate which can result in the gelation of the reaction mixture if the diisocyanate is used in a large excess or the hydroxy polymer initially is of a very high molecular weight. The first two methods should be used, therefore, only for special polymer compositions.

The third method, on the other hand, will usually not result in significant polymer gelation and, moreover, the degree of modification of the polymer can quite easily be varied over a wide range. Hence, the third technique shown in Equation (II), is the most preferred for practical application.

Using the third method (3.), however, prior to the present invention, it had been found to be difficult to isolate an isocyanate which contains both an active unsaturated bond and a free isocyanate group in the molecule, since even when an approximately equimolar reaction system is used, a bifunctional monomer as shown in parentheses in Equation (II) is usually formed as a byproduct. Although it is believed that a large number of side chain unsaturated bonds will best enhance the cure properties of the resin, the presence of a large amount of low molecular weight nonvolatile matter, which has no barrier film-forming properties in the surface of a coating film, tends to increase the penetration of oxygen into the coating film which can hinder cross-linking on the inside of the coating film.

In order to avoid incorporating such a bifunctional monomer, it is necessary to use the diisocyanate in an excess amount with respect to the hydroxy acrylate. Such an unsaturated isocyanate mixture, however, is apt to cause gelation on modification of the hydroxy polymer, as in the cases of methods (1) and (2), since it contains unreacted free diisocyanate.

In accordance with the present invention, however, a resin which has excellent air curability without gelation during synthesis is obtained by reacting (A) a hydroxy polymer within the proportions of 1,000 g. of the hydroxy polymer to 0.1 to 0.4 gram equivalents of (B) with an unsaturated isocyanate obtained by reacting a hydroxy acrylate respresented by an acrylate, methacrylate or -chloroacrylate ester containing one hydroxyl group in the molecule with a diisocyante in a molar ratio of 1.4 : 1 to 0.6 : 1 and preferably from 1.2 : 1 to 0.8 : 1.

The hydroxy polymer used in the present invention should contain as an integral part thereof at least 0.1 moles per 1,000 g. of polymer, of a hydroxyl-group containing monomer.

The hydroxy polymer may be prepared by various methods, e.g.: it may be prepared by (1) polymerizing a hydroxyl group-bearing unsaturated monomer with or without one or more copolymerizable monomers, (2)

by polymerization or copolymerization of a vinyl ester, such as vinyl acetate, vinyl propionate or vinyl butylate, and hydrolyzing the resulting polymer or copolymer to introduce hydroxyl groups therein, (3) by reacting an epoxy group-containing polymer, such as a polymer or copolymer of glycidyl methacrylate or acrylate, with a carboxylic acid so as to introduce hydroxyl groups through a ring opening reaction of epoxy groups, or, (4) by reacting a carboxyl group containing polymer with an epoxy compound, such as ethylene oxide, propylene oxide, or epichlorohydrin, so as to introduce hydroxyl groups concurrently with a chain opening reaction. Among these known methods, the most easily practicable and advantageous is the method (1). The hydroxyl group-containing polymerizable unsaturated monomer used in the method (1) includes, e.g., allyl alcohol, methallyl alcohol, 2-hydroxyethyl methacrylate and like ester alcohols of polymerizable unsaturated carboxylic acids of the type prepared by reacting an equivalent of a polymerizable unsaturated carboxylic acid such as, e.g., methacrylic acid, acrylic acid, maleic acid, fumaric acid, itaconic acid or crotonic acid, with 1 mole of a polyhydric alcohol such as, e.g., ethylene glycol, propylene glycol, glycerol or trimethylol propane; adducts of a glycidyl ester, especially one containing no polymerizable unsaturated bond in molecule as glycidyl yersatate sold under the trade name of "Cardura E" with a polymerizable unsaturated carboxylic acid as mentioned above; hydroxyl group-containing aromatic monomers such as, e.g., o-, m- and p-hydroxy-styrenes; and mixtures thereof.

Almost any vinyl compound can be used as the copolymerizable monomer containing no hydroxyl group for copolymerization with the hydroxyl group-containing monomers. For example, suitable monomers include styrene, vinyltoluenes, α-methylstyrene, vinyl acetate, dimethyl fumarate, acrylonitrile, methacrylonitrile, and, in addition, substituted - or unsubstituted aliphatic-, alicyclic - or aromatic esters of acrylic or methacrylic acids. Mixtures of two or more of such monomers may also be used.

Although the synthesis of the hydroxy polymer may be attained by conventional means including solution polymerization, suspension polymerization or block polymerization, it is most advantageous to carry out this reaction by solution polymerization for ease of operation.

A wide variety of solvents can be used in the synthesis of the hydroxy polymer by solution polymerization. For example, suitable organic solvents which do not contain an active hydrogen atom capable of reacting with an isocyanate include aromatic hydrocarbons such as xylene, toluene and the like; ketones such as acetone, methyl ethyl ketone, methyl isobutyl ketone and the like; esters such as ethyl acetate, butyl acetate, amyl acetate, 2-ethoxyethyl acetate and the like; or mixtures thereof.

A polymerization initiator can be used in the present invention such as benzoyl peroxide, azobisisobutylonitrile and like known radical polymerization initiators. If desired, a chain transferring agent such as lauryl mercaptan, thiodiglycolates and the like may be used in combination with the polymerization initiator.

The following discussion illustrates the synthesis of the hydroxy polymer in more detail. In this discussion, all parts are by weight unless otherwise specified. The polymerization is conducted at 40° to 150° C., preferably 60° to 120° C. by adding to 100 parts of the monomer mixture all at once or portion-by-portion 100 to 25, and preferably 65 to 35 parts of a solvent, 0.1 to 5 and preferably 0.5 to 2 parts of a polymerization initiator and, optionally, 0.1 to 3 parts of a chain transferring agent.

Among those diisocyanates used in the present invention for the synthesis of the unsaturated isocyanate (B) includes aliphatic, alicyclic and aromatic diisocyanates such as hexamethylene diisocyanate, dicyclohexylmethane-4,4'-diisocyanate, 3,3'-dimethyl-diphenyl-4,4'-disocyanate, tolylene-2, 4-diisocyanate, tolylene-2,6-diisocyanate,m-xylene diisocyanate, m-cylene diisocyanates, diphenyl-methane-4,4'-diisocyanate, 3-methyldiphenylmethane4,4'-diisocyanate, m- and p-phenylene diisocyanates, diphenyl ether diisocyanates, naphthalene-1 5-diisocyanate, lysin alkyl ester diisocyanate, or the like.

Suitable hydroxy acrylates used in the present invention include the monoesters of a dihydroxy alcohol or its derivative with acrylic or methacrylic acid such as 2-hydroxyethyl acrylate, 2-hydroxypropyl acrylate, 2-hydroxyethyl methacrylate, 2-hydroxypropyl methacrylate, 2-hydroxy-3-chloropropyl acrylate, 2-hydroxy-3-chloropropyl methacrylate, or the like.

The unsaturated isocyanate (B) is prepared by mixing 1.4 to 0.6 and preferably 1.2 to 0.8 mole of the hydroxy acrylate with one mole of the diisocyanate and heating the mixture at 20° to 100° C., and preferably 40° to 80° C. until the isocyanate equivalent of the reaction product becomes constant. Known catalysts such as tertiary amines including triethylamine, N-methylmorphorine, triethylenediamine or the like; organometallic compounds such as zinc octoate, lead octoate, dibutyl tin dilaurate or the like; mineral acids such as hydrochloric acid, nitric acid or the like; or phosphines can be used.

The reaction between the hydroxy polymer (A) and the unsaturated isocyanate (B) (hereinafter referred to as "urethane formation") is carried out in the same manner as the method discussed above with respect to the unsaturated isocyanate. Namely, the reaction may be carried out under the same conditions except that the unsaturated isocyanate (B) is used in an amount such as to provide one equivalent of isocyanate group per 10 to 0.5 and preferably 6 to 1 equivalent of hydroxyl group in the hydroxy polymer (A).

In conducting the urethane formation, either the entire solvent quantity or a portion of the solvent may be substituted with the copolymerizable monomer.

After the formation of the urethane, one or more monomers selected from the group consisting of the hydroxyl group-containing polymerizable monomers and the monomers copolymerizable therewith are added to the reaction mixture in an amount of 50 percent –400 percent by weight and preferably 100 percent –200 percent by weight of the inert solvent present in the system so as to adjust the viscosity of the system to a value suitable for processing.

If desired, a stabilizer may be added such as hydroquinone or catechol.

Also, if desired, various inert additives can be added to the resin solution, such as a filler, pigment or the like. The solution can then be applied to a substrate by, e.g., spray coating, dip coating, or roller coating and the coating film thus formed is cured by irradiation by ionizing rays such as β-rays, α-rays, accelerated electron rays or the like.

In industrial application, it is advantageous to use accelerated electron rays, especially those from a known accelerator of a voltage of 0.1 to 2 MeV and a capacity of 0.02 to 200 mA.

Where the unsaturated isocyanate is used in an amount of less than the previously mentioned amount of isocyanate equivalent to the hydroxyl equivalent of the hydroxy polymer, a polyisocyanate compound such as, e.g., an adduct of 3 moles of hexamethylenediisocyanate or xylylenediisocyanate with one mole of trimethylol propane may be used to effect subsidiary cross-linking by urethane formation.

The present invention will be illustrated by the following examples in which all parts and per cents are by weight unless otherwise indicated.

EXAMPLE 1

A mixture of 50 parts of methyl methacrylate, 30 parts of butyl methacrylate, 20 parts of 2-hydroxyethyl methacrylate and 1 part of axobisisobutylonitrile was added dropwise to 50 parts of boiling butyl acetate over a period of 2 hours. After completion of polymerization, 50 parts of methyl methacrylate was added to the polymerization mixture to obtain a hydroxy polymer solution (A-1).

In another reaction vessel, 168 parts (1.0 mole) of hexamethylene diisocyanate was reacted with 100 parts (0.86 mole) of 2-hydroxyethyl acrylate at 50° C. for 3 hours and then diluted with 170 parts of methyl methacrylate to obtain a mixture (I — 1) of an isocyanate equivalent of 400 containing an unsaturated isocyanate as a main component.

135 parts of (A-1) was reacted (urethanized) with 10 parts of (I—1 at 60° C. for 5 hours. The resinous solution thus obtained was applied by means of a bar coater to a steel panel to form a coating film of a thickness of 40 microns and the coating film was irradiated at room temperature at a dose of 3 Mrad by means of an electron accelerator of an acceleration voltage of 500 KeV. The irradiated coating film exhibited excellent properties. The results of the performance tests were shown in the Table 1.

EXAMPLE 2

A cured coating film of good properties was obtained by applying and curing a resinous solution under the same conditions which solution was prepared in the same manner as in Example 1, except that 5 parts of the unsaturate isocyanate mixture (I — 1 ) in urethane formation was used. The results of the performance tests were shown in the Table 1.

EXAMPLE 3

A monomer mixture consisting of 40 parts of methyl methacrylate, 20 parts of vinyl acetate, 25 parts of butyl acrylate and 15 parts of 2-hydroxyethyl methacrylate was polymerized in the same solution polymerization process as in Example 1 and then diluted with methyl methacrylate. 100 parts of the polymer solution thus obtained was reacted in the same manner as in Example 1 with 4.4 parts of a mixture obtained by reacting in another reaction vessel 188 parts (1.0 mole) of xylylene diisocyanate with 128 parts (1.1 mole) of 3 -hydroxethyl acrylate at 50° C. for 3 hours to an isocyanate equivalent of 355, to obtain a solution of a copolymer resin having active unsaturated bond in side chains. 90 parts of the resinous solution and 10 parts of rutile-type titanium oxide were milled in a sand mill to obtain a white enamel. The enamel was applied to a steel panel and cured by the irradiation of electron rays in the manner as in Example 1. The coating film thus obtained exhibited excellent properties which were shown in the Table 1.

EXAMPLE 4

100 parts of a resinous solution prepared in the same manner as in Example 1 were mixed with 10 parts of a polyisocyanate resin obtained by reacting trimethylolpropane with tolylene diisocyanate in the molar ration of 1:3 at 60° to 70° C., and the mixture was applied was applied and cured in the manner as in Example 1 to obtain a coating film having excellent hardness, solvent resistance and other properties. The results were shown in the Table 1.

EXAMPLE 5

A mixture of 25 parts of styrene, 40 parts of methyl methacrylate, 23 parts of 2-ethylhexyl acrylate, 1 part of methacrylic acid, 11 parts of bis (2-hydroxypropyl) fumarate and 0.5 part of cumene hydroperoxide was added dropwise to 100 parts of boiling xylene over about 2 hours. After completion of the polymerization, xylene was eliminated under a reduced pressure to a non-volatile matter context of 85 percent. After completion of the condensation, the reaction mixture was adjusted with butyl acetate to a non-volatile matter content of 60 (A − 2).

In another reaction vessel, 156 parts (1.2 mole) of 2-hydroxyethyl methacrylate was reacted with 250 parts (1.0 mole) of diphenylmethane-4, 4'-diisocyanate at 60 ° C. for 4 hours to obtain a mixture (I − 2) of an isocyanate equivalent of 500 containing an unsaturated isocyanate as a main component.

167 parts of (A − 2) was reacted with 7 parts of the mixture (I — 1) in the same manner as in Example 1 and the reaction mixture was diluted with an 8 : 2 mixture of isobutyl methacrylate and butyl acrylate to a No. 4 Ford cup viscosity of 14 seconds. The coating thus obtained was applied by spray coating to a steel panel pretreated by zinc phosphate. The coating film was cured by irradiation of electron rays from a 0.5 MeV electron accelerator at a dose of 5 Mrad to obtain a well cured film, the properties of which were shown in the Table 1.

EXAMPLE 6

A mixture of 30 parts of styrene, 20 parts of butyl acrylate, 35 parts of isobutyl methacrylate, 15 parts of methacrylic acid and 1 part of azobisisobutylonitrile was added dropwise to 50 parts of boiling ethyl acetate over 2 hours. After boiling for an additional 1 hour for completion of polymerization, the polymerization mixture was added with 50 parts of xylene and then 15 parts of phenyl glycidyl ether and 0.1 part of 2-methylimidazole and heated at 100° C. for 5 hours to effect ring-opening esterification reaction between carboxyl groups in the polymer and the phenyl glycidyl ether.

To the solution thus obtained was added 15 parts of the mixture (I — 1) prepared in Example 1 and urethane formation was conducted in the same manner as in Example 1. After completion of the reaction, the mixture was diouted with methyl methacrylate to a No. 4 Ford cup viscosity of 15 seconds. The diluted mixture was applied by spraying to a steel panel and cured in the manner as in Example 1 to obtain a cured coating film of good hardness and solvent resistance of which the properties were shown in the Table 1.

EXAMPLE 7

168 parts (1.0 mole) of hexamethylene diisocyanate was reacted with 130 parts (0.86 mole) of 2-hydroxyethlα-chloroacrylate at 50° C. for 3 hours and then diluted with 170 parts of methyl methacrylate to obtain a mixture (I – 3) of an isocyanate equivalent of 450 containing an unsaturated isocyanate as a main component.

135 parts of the hydroxy polymer solution (A – 1) prepared in Example 1 was reacted (urethanized) with 10 parts of the (I – 30) at 60° C. for 5 hours. The resinous solution thus obtained was processed in the same manner as in Example 1 to obtain a cured coating film of good properties.

Comparative Example 1

The procedure as in Example 1 was repeated using 20 parts of the unsaturated isocyanate mixture (I —'1 The resinous solution thus obtained gave, when applied and cured in the same manner as in Example 1, an insufficiently cured coating film which was swollen by organic solvents and poor in water resistance. The results were summarized in the Table 1.

Comparative Example 2

The procedure as in Example 1 was repeated using 40 parts of the mixture (I — 1 in urethanization. The coating film prepared in the same manner as in Example 1 had a very soft surface and cured insufficiently even after irradiation by 10 Mrad of electron rays.

Comparative Example 3

The procedure as in Example 1 was repeated using 1.4 parts of the unsaturated isocyanate mixture (I— 1). The resinous coating film was soluble in organic solvent and poor in adhesion to the base even after irradiation by 10 Mrad of electron rays. The results were shown in the Table 1.

Comparative Example 4

A coating film obtained by applying the resinous solution in Example 1 to a steel panel and baking at 150° C. for 30 minutes was far inferior in curability to one irradiated by electron rays and easily dissolved in organic solvents.

Having now fully described the invention, it will be apparent ed the invention, it will be apparent to one of ordinary skill in the art that many changes and modifications can be made thereto without departing from the spirit and scope thereof. ACCORDINGLY,

What is claimed and intended to be covered by letters patent is:

1. A resinous coating composition capable of forming a cured coating film in air when irradiated with high energy ionizing radiation which comprises the admixture of
   1. a resin obtained by reacting
      A. a hydroxyl containing vinyl polymer or copolymer with
      B. an ethylenically unsaturated isocyanate obtained by reacting 1.4 to 0.6 moles of an ester of an α,β-unsaturated monocarboxylic acid containing at least one hydroxyl group in the molecule with one mole of a diisocyanate, wherein 1,000 gm. of (A) had been reacted with 0.1 to 0.4 gram equivalents of (B), to form a vinyl polymer or copolymer containing ethylenically unsaturated side chains, and,
   2. a monomer copolymerizable with said ethylenically unsaturated bonds in said resin (1).

2. A resinous composition as defined in claim 1 in which the vinyl polymer or copolymer (A) containing hydroxyl groups in side chains is a polymer or copolymer of a hydroxyl group-containing unsaturated monomer.

3. A resinous composition as defined in claim 1 in which the vinyl polymer or copolymer (A) containing hydroxyl groups in side chains is a copolymer of a hydroxyl group-containing unsaturated monomer and a monomer copolymerizable therewith which is free of any hydroxyl groups.

4. A resinous composition as defined in claim 1 in which the ester of an α,β-unsaturated monocarboxylic acid is a member of the group consisting of esters of acrylic acid, methacrylic acid and crotonic acid, said ester containing at least one hydroxyl group per molecule.

5. A process for preparing a resinous coating composition which comprises:
   1. reacting
      A. a hydroxy containing vinyl polymer or copolymer with,
      B. an ethylenically unsaturated isocyanate obtained by reacting 1.4 to 0.6 moles of an ester of an α,β-unsaturated monocarboxylic acid containing at least one hydroxyl group in the molecule with one mole of a diisocyanate

|  | Example No. | | | | | | | Comparative example No. | | | |
| --- | --- | --- | --- | --- | --- | --- | --- | --- | --- | --- | --- |
|  | 1 | 2 | 3 | 4 | 5 | 6 | 7 | 1 | 2 | 3 | 4 |
| Gram equivalents of unsaturated isocyanate per 1,000 g. of hydroxy polymer | 0.4 | 0.2 | 0.3 | 0.4 | 0.1 | 0.3 | 0.35 | 0.7 | 1.5 | 0.05 | 0.4 |
| Hardness (pencil hardness) | H | F | H | 2H | H | H | H | B | (¹) | F | F |
| Scratch resistance | ○ | ○ | ○ | ○ | ○ | ○ | ○ | ○ | Q | X | ○ |
| Gasoline resistance (2 hours immersion) | □ | □ | □ | □ | □ | □ | □ | △ | X | X | X |
| Water resistance (40° C., 24 hours) | □ | □ | □ | □ | □ | □ | □ | ○ | △ | △ | ○ |
| Acid resistance (5% aq. HCl, 24 hours) | □ | □ | □ | □ | □ | □ | □ | ○ | ○ | △ | △ |
| Alkali resistance (5% aq. NaOH, 24 hours) | □ | □ | □ | ○ | ○ | □ | □ | △ | △ | △ | △ |

¹ Less than 4B.
NOTE.—□: Not changed at all, ○: Slightly changed, △: Changed to a great extent, X: Completely deteriorated.

wherein 1,000 gm. of (A) is reacted with 0.1 to 0.4 gram equivalents of (B) to form a vinyl polymer or copolymer containing ethylenically unsaturated side chains, and, 2. admixing the product obtained from (1.) with an ethylenically unsaturated monomer which is copolymerizable with the unsaturated side chains of the product of (2.).

6. The process of claim 5 wherein said admixture is subjected to the action of high energy ionizing radiation at a dose rate sufficient to copolymerize said ethylenically unsaturated monomer (2.) with said resinous product (1.) and thereby cross-link said resinous product.

7. The process of claim 5 wherein said hydroxy containing vinyl polymer is formed by polymerizing a hydroxyl group containing an ethylenically unsaturated monomer.

8. The process of claim 5 wherein said hydroxy containing vinyl polymer is formed by polymerization or copolymerization of a vinyl ester which is thereafter hydrolyzed to form hydroxyl groups.

9. The process of claim 5 wherein said hydroxy containing vinyl polymer is formed by reacting a polyepoxide with a carboxylic acid.

10. The process of claim 5 wherein the reaction of (A) and (B) is conducted at a temperature of from 40° C. – 150° C.

* * * * *